(12) United States Patent
Kawai

(10) Patent No.: US 6,480,060 B2
(45) Date of Patent: Nov. 12, 2002

(54) FSK SIGNAL DEMODULATING INTEGRATION-DISCHARGE CIRCUIT

(75) Inventor: Kazuo Kawai, Tokyo (JP)

(73) Assignee: General Research of Electronics, Inc., Tokyo (JP)

( * ) Notice: Subject to any disclaimer, the term of this patent is extended or adjusted under 35 U.S.C. 154(b) by 0 days.

(21) Appl. No.: 09/811,330

(22) Filed: Mar. 16, 2001

(65) Prior Publication Data

US 2002/0000876 A1 Jan. 3, 2002

(30) Foreign Application Priority Data

Jun. 28, 2000 (JP) ........................................ 2000-194003

(51) Int. Cl.[7] .............................................. H03D 3/00
(52) U.S. Cl. ...................................... 329/301; 375/334
(58) Field of Search ................................. 329/300, 301; 375/334

(56) References Cited

U.S. PATENT DOCUMENTS 3,014,183 A  * 12/1961 Gilbert et al. ............... 329/300
5,724,001 A  *  3/1998 Chang ......................... 329/302

FOREIGN PATENT DOCUMENTS

GB            2055520   *  3/1981 ............ H03K/9/06

* cited by examiner

Primary Examiner—Robert Pascal
Assistant Examiner—Joseph Chang
(74) Attorney, Agent, or Firm—Flynn, Thiel, Boutell & Tanis, P.C.

(57) ABSTRACT

A FSK signal demodulating integration-discharge circuit has a simple circuit configuration and utilizes an AC waveform of the FSK signal as a. control signal for a transistor gate. FSK signals are converted into rectangular-wave signals by the use of a limiter, before adding the rectangular-wave signal to an integrating capacitor $C_1$ through a resistor. The capacitor $C_1$ connects to a first transistor in parallel thereto, which is turned ON/OFF due to the rectangular-wave signal. The signal causes the capacitor $C_1$ to be charged by the voltage corresponding to time length of a half cycle of a portion of positive voltage of the rectangular-wave signal, while causing the above capacitor $C_1$ to discharge in terms of electric charge of the capacitor $C_1$ by the voltage corresponding to time length of a half cycle of a portion of negative voltage of the rectangular-wave signal. Charged voltage from the capacitor $C_1$ also feeds into a holding capacitor $C_2$ through a second transistor. The second transistor is turned ON/OFF by the rectangular-wave signal. The holding capacitor $C_2$ is charged at the same time the capacitor $C_1$ is charged at the portion of a positive voltage, while at the next portion of negative voltage, the holding capacitor $C_2$ is separated from the capacitor $C_1$. Thus the capacitor $C_1$ discharges, while the holding capacitor $C_2$ holds charged voltage. This operation can obtain a hold voltage that is approximately inversely proportional to the frequency of the FSK signal.

2 Claims, 4 Drawing Sheets

FSK SIGNAL DEMODULATING INTEGRATION-DISCHARGE CIRCUIT

BACKGROUND OF THE INVENTION

1. Field of the Invention

The present invention relates to improvement of circuit configuration technique of an integration-discharge circuit appropriate for the case of converting frequency of the signal into voltage in order to demodulate voice band FSK (Frequency Shift Keying) signal.

2. Description of the Related Art

Generally, an integration-discharge circuit is configured so as to execute a series of operation. In the integration-discharge circuit, integration is made to execute on input signals during specific times, followed by holding to be taken the integrated voltage directly or followed by holding to be taken the integrated voltage after sampling, and executing a series of operation for discharging the integrated voltage for the sake of next integration operation. For that reason, conventional integration-discharge circuit required the center integration circuit and the peripheral some gate circuits and further the control signal generation circuit for controlling these gate circuits with appropriate timing. Furthermore, in many cases, generally, analog switch is used for ON/OFF of input signal for the integration circuit, gate for ON/OFF of sampling and/or holding of integrated voltage, gate for discharge of integrated voltage and so forth. Dedicated IC for the hold is used in the hold circuit.

Integration-discharge operation based on the conventional circuit configuration requires complicated circuit configuration and high cost. The conventional integration-discharge circuit includes the integration circuit, a plurality of gate circuits and the control signal generation circuit. The integration circuit, a plurality of gate circuit and the control signal generation circuit are combined to realize the integration-discharge operation depending on coordinate operation of these circuits. Accordingly, the present inventor investigates to achieve this problem. And he has found that an integration-discharge circuit with simple circuit configuration is capable of being realized while utilizing FSK signal itself as the control signal. When the FSK signal is demodulated, polarity of the signal voltage of the FSK signal has a phenomenon of sign inversion in every half cycle of AC signal of the FSK.

SUMMARY OF THE INVENTION

In view of the foregoing, it is an object of the present invention is to provide a FSK signal demodulation integration-discharge circuit.

According to a first aspect of the present invention, a FSK signal demodulating integration-discharge circuit comprising converting means for converting FSK signal into rectangular-wave signal, an integrating capacitor which charges the rectangular-wave signal therein in such a way that charging is made to execute corresponding to a portion of positive voltage or negative voltage of said rectangular-wave signal according to ON/OFF of a first transistor that is turned ON/OFF due to said rectangular-wave signal, while which integrating capacitor discharges the rectangular-wave signal therefrom in such a way that discharging is made to execute corresponding to a portion of positive voltage or negative voltage of said rectangular-wave signal according to ON/OFF of the first transistor that is turned ON/OFF due to said rectangular-wave signal, a holding capacitor which charges the charged voltage of the integrating capacitor therein in such a way that charging is made to execute corresponding to a portion of positive voltage or negative voltage of said rectangular-wave signal according to ON/OFF of a second transistor that is turned ON/OFF due to the rectangular-wave signal, while which holding capacitor discharges the charged voltage of said integrating capacitor therefrom in such a way that discharging is made to execute corresponding to a portion of positive voltage or negative voltage of the rectangular-wave signal according to ON/OFF of the second transistor that is turned ON/OFF due to the rectangular-wave signal, and taking out means for taking out a voltage which is subjected to holding by the holding capacitor.

According to a second aspect of the present invention, in the first aspect, a FSK signal demodulating integration-discharge circuit, wherein the taking out means takes out the voltage which is subjected to holding through a high input impedance circuit.

According to a third aspect of the present invention, a FSK signal demodulating integration-discharge circuit comprising converting means for converting FSK signal into rectangular-wave signal, a first integrating capacitor which charges the rectangular-wave signal therein in such a way that charging is made to execute corresponding to a portion of positive voltage or negative voltage of the rectangular-wave signal according to ON/OFF of a first transistor that is turned ON/OFF due to the rectangular-wave signal, while which first integrating capacitor discharges the rectangular-wave signal therefrom in such a way that discharging is made to execute corresponding to a portion of positive voltage or negative voltage of the rectangular-wave signal according to ON/OFF of the first transistor that is turned ON/OFF due to the rectangular-wave signal, a first holding capacitor which charges the charged voltage of the integrating capacitor therein in such a way that charging is made to execute corresponding to a portion of positive voltage or negative voltage of the rectangular-wave signal according to ON/OFF of a second transistor that is turned ON/OFF due to the rectangular-wave signal, while which first holding capacitor discharges the charged voltage of the integrating capacitor therefrom in such a way that discharging is made to execute corresponding to a portion of positive voltage or negative voltage of the rectangular-wave signal according to ON/OFF of the second transistor that is turned ON/OFF due to the rectangular-wave signal, an inverting means for outputting an inversion rectangular-wave signal while inverting a phase of the rectangular-wave signal, a second integrating capacitor which charges the rectangular-wave signal therein in such a way that charging is made to execute corresponding to a portion of positive voltage or negative voltage of the rectangular-wave signal according to ON/OFF of a third transistor that is turned ON/OFF due to the rectangular-wave signal, while which second integrating capacitor discharges the rectangular-wave signal therefrom in such a way that discharging is made to execute corresponding to a portion of positive voltage or negative voltage of the rectangular-wave signal according to ON/OFF of the third transistor that is turned ON/OFF due to the rectangular-wave signal, a second holding capacitor which charges the charged voltage of the integrating capacitor therein in such a way that charging is made to execute corresponding to a portion of positive voltage or negative voltage of the rectangular-wave signal according to ON/OFF of a fourth transistor that is turned ON/OFF due to the rectangular-wave signal, while which second holding capacitor discharges the charged voltage of the integrating capacitor therefrom in such a way that discharging is made to execute corresponding to a portion of positive voltage or negative voltage of the rectangular-wave signal according to ON/OFF of the fourth transistor that is turned ON/OFF due to the rectangular-wave signal, and taking out means for taking out a voltage which is subjected to holding by the first or the second holding capacitor.

According to a fourth aspect of the present invention, in the third aspect, a FSK signal demodulating integration-discharge circuit, wherein the taking out means takes out the voltage which is subjected to holding through a high input impedance circuit.

The various features of novelty which characterize the invention are pointed out with particularly in the claims annexed to and forming a part of this specification. For a better understanding of the invention, its operating advantages, and specific objects attained by its use, reference should be had to the accompanying drawing and descriptive matter in which there is illustrated and described a preferred embodiment of the invention.

DETAILED DESCRIPTION OF THE PREFERRED EMBODIMENT

Figure 1:
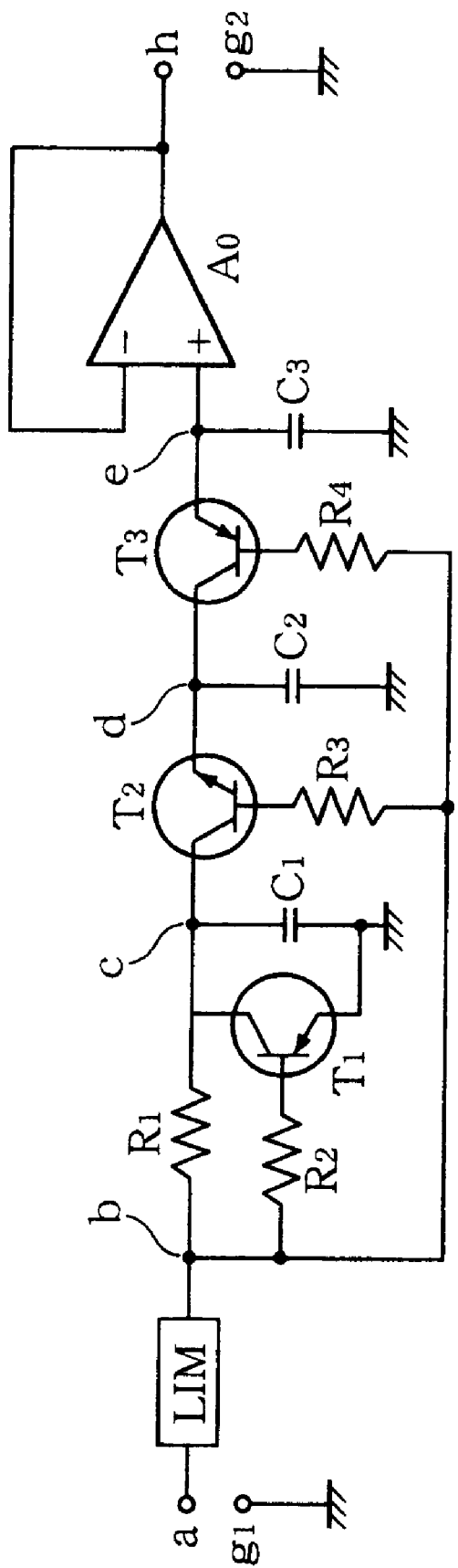
FIG. 1 is a circuit configuration view illustrating one embodiment of the present invention.
Figure 2:
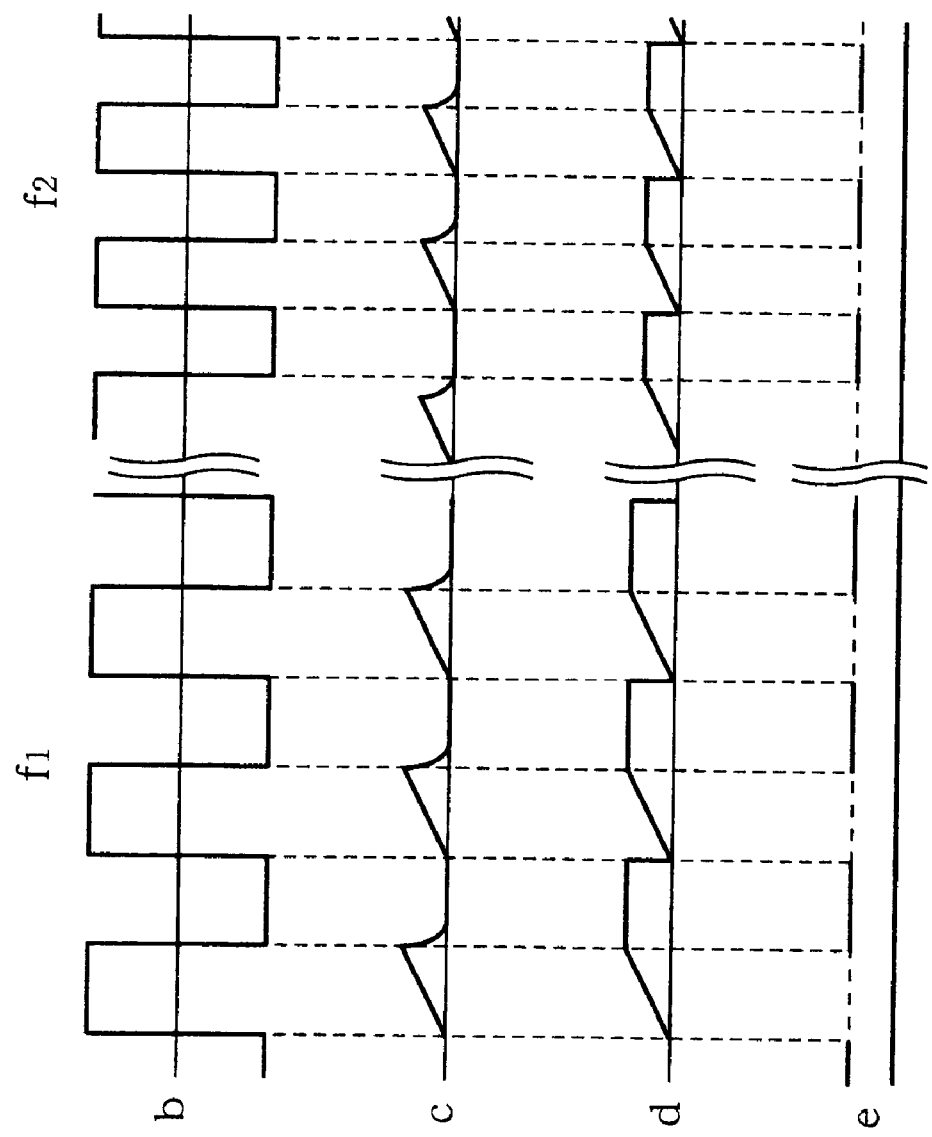
FIG. 2 is a waveform view for explaining operation of the circuit of FIG. 1.

FIG. 1 illustrates configuration of one embodiment of a circuit of the present invention, and FIG. 2 is the waveform view for operation explanation thereof.

In FIG. 1, "a", "$g_1$" are input terminals of the FSK signal, "LIM" is a limiter or a rectangular-wave conversion circuit such as a comparator and so forth, $R_1$ to $R_4$ are resistors, $C_1$ is a capacitor for integration, $C_2$ is a holding capacitor, $T_1$ and $T_3$ are PNP transistors, and $T_2$ which is NPN transistor is turned ON/OFF by the rectangular-wave signal. Ao is an operational amplifier circuit as a high input impedance circuit, and "h", "$g_2$" are output terminals.

Marks "b", "c", "d" and "e" of FIG. 2 indicate signal waveforms at the same mark points of FIG. 1. Further, "$f_1$", "$f_2$" of FIG. 2 indicate waveforms in the case that frequencies of the FSK signal are "$f_1$", "$f_2$" respectively.

The FSK signal which is input from the input terminals of "a", "$g_1$" is converted by the rectangular-wave signal conversion circuit LIM into the rectangular-wave signal, thus resulting in the rectangular-wave signal indicated by "b" of FIG. 2. This rectangular-wave signal is input to a transistor $T_1$ through a resistor $R_2$. Since the transistor $T_1$ is the PNP type transistor, when the rectangular-wave signal corresponds to a part of positive voltage, condition between collector and emitter becomes OFF (open), while when the rectangular-wave signal corresponds to a part of negative voltage, condition between collector and emitter becomes ON (short). Consequently, integration is made to execute by using the resistor $R_1$ and the capacitor $C_1$ if the FSK signal is the part of the positive voltage. While discharge is made to execute concerning the integrated voltage through the transistor $T_1$ if the FSK signal is the part of the negative voltage, thus the waveform signal illustrated by "c" of FIG. 2 is generated at the point of "c". Since the transistor $T_2$ is NPN type transistor, the transistor $T_2$ turns ON if the rectangular-wave signal corresponds to the part of the positive voltage. At this time, the capacitor $C_1$ as well as the capacitor $C_2$ are charged, while when the transistor $T_2$ turns OFF at the part of the negative voltage, the integrated voltage as it stands is held in the capacitor $C_2$. Consequently, a waveform signal illustrated by "d" of FIG. 2 is generated at the point "d". Within a period when the capacitor $C_2$ holds the integrated voltage, namely, the rectangular-wave signal corresponds to period of the part of the negative voltage, a transistor $T_3$ is turned ON, therefore, a part of electric charge of the capacitor $C_2$ is moved toward the capacitor $C_3$. For that reason, if the integrated voltage is taken as E(v), the hold voltage of the point "e" becomes $E(v) \cdot C_2/(C_2+C_3)$ which is slightly lower than E(v). A decrease from this hold voltage E(v) is slight if the relationship between $C_2$ and $C_3$ is $C_2 >> C_3$. However, the capacitor $C_3$ results in small in accordance with the state of $C_3$. Therefore, it is desirable to take out the above hold voltage through the high input impedance circuit. The operational amplifier circuit Ao is a voltage follower. The operational amplifier Ao is one example of the aforementioned high input impedance circuit. Dot line section of FIG. 2e indicates a portion that is held by the capacitor $C_3$.

Figure 3:
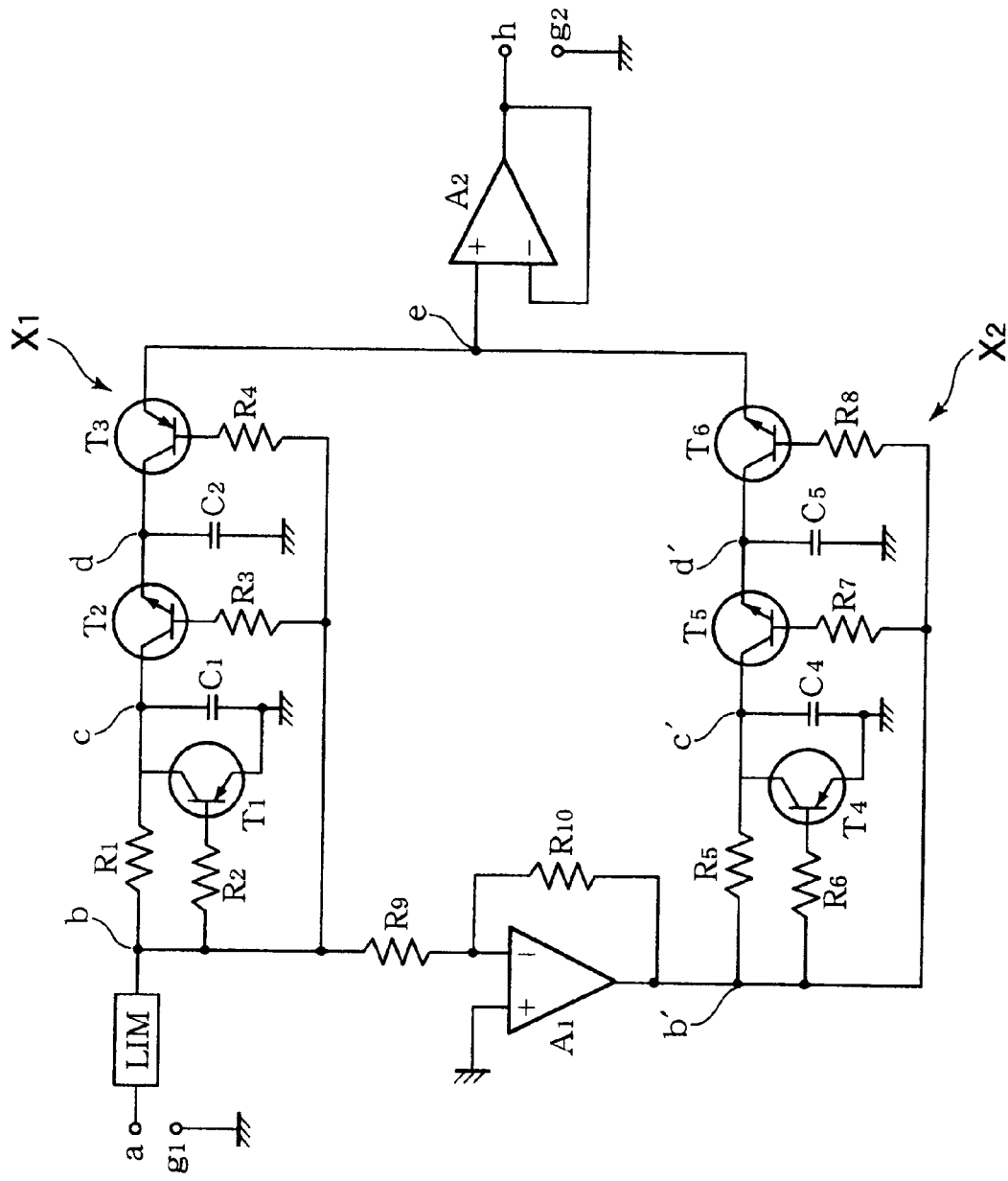
FIG. 3 is a circuit configuration view illustrating another embodiment of the present invention.

As understood from the above explanation, the circuit of FIG. 1 only utilizes information corresponding positive half cycle of the rectangular-wave signal which corresponds to the FSK signal in order to obtain an integrated output. However, if utilization is made to execute not only information corresponding to the positive half cycle but also information corresponding to the negative half cycle, it is possible to detect faster frequency alteration of the FSK signal in comparison with the case of FIG. 1. In order to cause this operation to be executed, it is necessary to prepare one more circuit possessing the same configuration as that of FIG. 1. Then, operation is made to execute by using the signal which is obtained in such a way that the above negative half cycle signal is subjected to phase inversion. FIG. 3 is an example of the circuit capable of implementing this operation.

Figure 4:
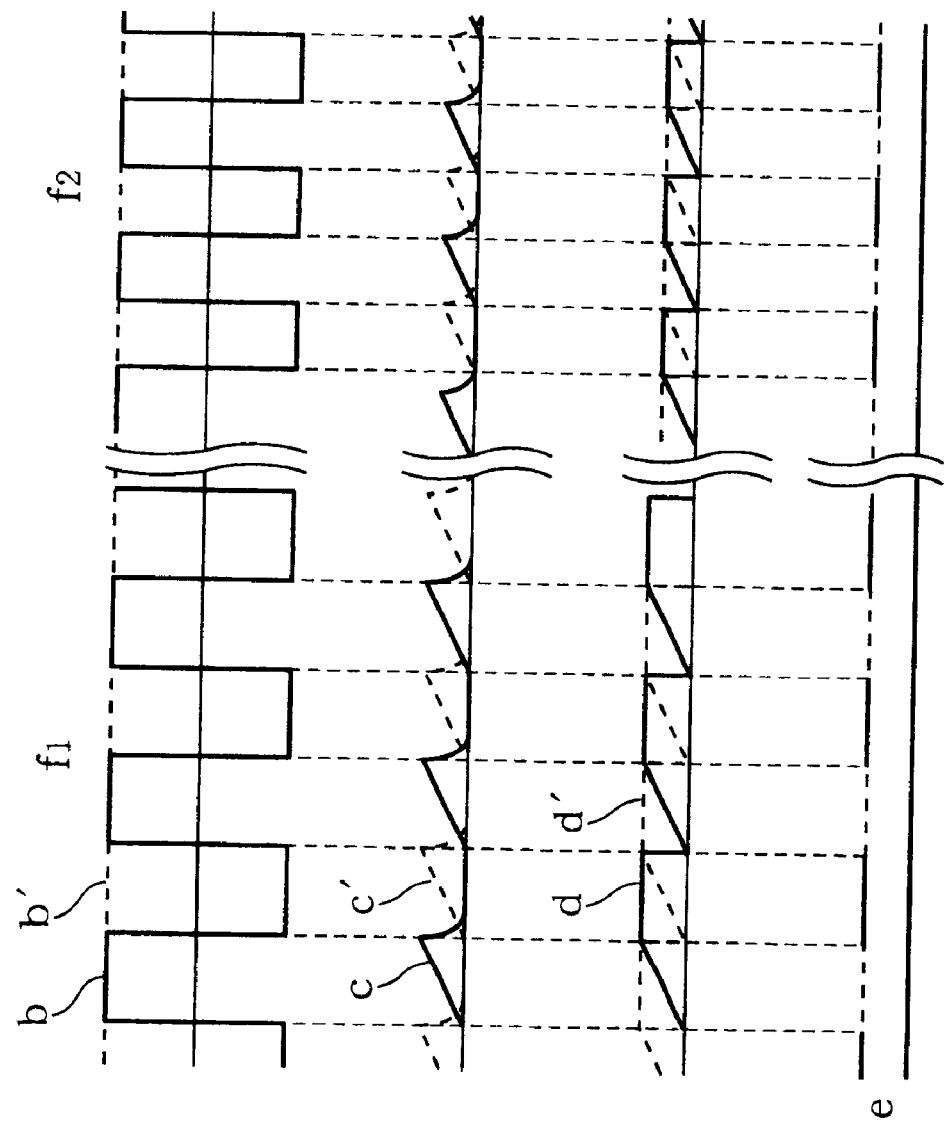
FIG. 4 is a waveform view for explaining operation of the circuit of FIG. 3.

Circuit section $X_1$ consisting of $T_1$, $T_2$ and $T_3$ of upper stage of FIG. 3 is the same as that of FIG. 1, thus operation is made to execute with the waveform of the rectangular-wave signal of the "b" point while corresponding to half cycle of the positive voltage part thereof. Circuit section $X_2$ consisting of $T_4$, $T_5$ and $T_6$ of lower stage of FIG. 3 is completely the same configuration as that of the upper stage circuit. However, the input signal is the signal in which phase of the above rectangular-wave signal is inverted by inversion amplifier of $A_1$, thereby half cycle waveform of the negative voltage part at the "b" point becomes waveform of the positive voltage at the "b" point. Operation of the circuit section $X_2$ is made to execute in the same way as that of the upper stage circuit $X_1$ against this waveform. FIG. 4 indicates this circumstance in its waveform view. Waveform of a solid line indicated in "e" of FIG. 4 indicates signal waveform appearing in "e" point through the upper stage circuit $X_1$ of FIG. 3, while waveform of a dot line indicates signal waveform appearing in "e" point through the lower stage circuit $X_2$ of FIG. 3.

Thus, it is possible to detect half cycle length information of the whole FSK signal (rectangular-wave signal) in every half cycle.

Furthermore, in the above explanation, explanation is made to perform about operation of the case in which center level of the rectangular-wave signal is 0 volt, and the waveform is taken to be double-current waveform with sign condition of voltage balanced. However, such operation is capable of being performed even when the rectangular-wave signal is single-current waveform. In such a case, if the rectangular-wave signal amplitude is taken to be V volt, it is suitable to employ a measures (for example, bias voltage changing volume) capable of causing reference voltage of the transistors $T_1$ to $T_6$ to be V/2 volt.

Moreover, in the explanation of FIG. 1, the transistors of $T_1$ and $T_3$ are the PNP-type transistors, and the transistor of $T_2$ is the NPN-type transistor, while in the explanation of FIG. 3, the transistors of $T_1$, $T_3$, $T_4$, and $T_6$ are the PNP-type transistors, and the transistors of $T_2$ and $T_5$ are the NPN-type transistors. However, it is possible to reverse the type of the transistor in such a way as to use with the PNP-type transistor as the NPN-type transistor and vice versa. In such a case that the type of the transistor is reversed, it is suitable that the positive voltage of the rectangular-wave signal is read to be changed into the negative voltage and vice versa in the above-described explanation.

It should be noted that, in the configuration of FIG. 3, the capacitor $C_3$ is not required because of the following reason.

FIG. 4 illustrates the signal waveform of respective points of FIG. 3. As illustrated by the waveform of the third stage of FIG. 4, the waveform of the straight line portion of "d" appears at the "e" point from the upper circuit $X_1$, while the waveform of the straight line portion of the dotted line waveform of "d" appears at the "e" point from the lower circuit $X_2$, thus, as illustrated in the waveform of the lowest stage of FIG. 4, the straight line waveform is connected to the dotted line waveform, therefore, the $C_3$ becomes unnecessary.

Namely, since there is no lower circuit $X_2$ of FIG. 3 in the circuit of FIG. 1, operation is made to compensate for the time period when the signal is not input from the lower circuit $X_2$ by the use of the hold voltage of the $C_3$. Consequently, the straight line waveform is connected to the dotted line waveform apparently, however, since frequency information of the input signal is not input, the circuit of FIG. 4 is capable of detecting fast frequency alteration.

As is clear by the explanation described-above, according to the present invention, the appropriate integration-discharge circuit for demodulation of the FSK signal of the voice band and so forth can be realized with extremely simple circuit configuration.

While there has been described what is at present considered to be preferred embodiment of the invention, it will be understood that various modifications may be made therein, and it is intended to cover in the appended claims all such modifications as fall within the true spirit and scope of the invention.

What is claimed is:

1. A FSK signal demodulating integration-discharge circuit comprising:

a converter for converting a FSK signal into a rectangular-wave signal;

a first integrating capacitor for charging the rectangular-wave signal therein so that charging executes corresponding to a portion of positive voltage or negative voltage of said rectangular-wave signal according to an ON/OFF condition of a first transistor that is turned ON/OFF due to said rectangular-wave signal, said first integrating capacitor for discharging the rectangular-wave signal therefrom so that discharging executes corresponding to a portion of positive voltage or negative voltage of said rectangular-wave signal according to the ON/OFF condition of said first transistor that is turned ON/OFF due to said rectangular-wave signal;

a first holding capacitor for charging the charged voltage of said first integrating capacitor therein so that charging executes corresponding to a portion of positive voltage or negative voltage of said rectangular-wave signal according to an ON/OFF condition of a second transistor that is turned ON/OFF due to said rectangular-wave signal, said first holding capacitor for discharging the charged voltage of said first integrating capacitor therefrom so that discharging executes corresponding to a portion of positive voltage or negative voltage of said rectangular-wave signal according to the ON/OFF condition of said second transistor that is turned ON/OFF due to said rectangular-wave signal;

an inverter for outputting an inversion rectangular-wave signal while inverting a phase of said rectangular-wave signal;

a second integrating capacitor for charging the rectangular-wave signal therein so that charging executes corresponding to a portion of positive voltage or negative voltage of said rectangular-wave signal according to an ON/OFF condition of a third transistor that is turned ON/OFF due to said rectangular-wave signal, said second integrating capacitor for discharging the rectangular-wave signal therefrom so that discharging executes corresponding to a portion of positive voltage or negative voltage of said rectangular-wave signal according to the ON/OFF condition of said third transistor that is turned ON/OFF due to said rectangular-wave signal;

a second holding capacitor for charging the charged voltage of said integrating capacitor therein so that charging executes corresponding to a portion of positive voltage or negative voltage of said rectangular-wave signal according to an ON/OFF condition of a fourth transistor that is turned ON/OFF due to said rectangular-wave signal, said second holding capacitor for discharging the charged voltage of said second integrating capacitor therefrom so that discharging executes corresponding to a portion of positive voltage or negative voltage of said rectangular-wave signal according to the ON/OFF condition of said fourth transistor that is turned ON/OFF due to said rectangular-wave signal; and an output device for outputting a voltage which is subjected to holding by said first or second holding capacitor.

2. A FSK signal demodulating integration-discharge circuit according to claim 1, wherein said output device outputs said voltage through a high input impedance circuit.

* * * * *